United States Patent [19]
Kurumida

[11] Patent Number: 5,623,584
[45] Date of Patent: Apr. 22, 1997

[54] OUTPUT METHOD AND APPARATUS

[75] Inventor: Tsuneaki Kurumida, Kawasaki, Japan

[73] Assignee: Canon Kabushiki Kaisha, Tokyo, Japan

[21] Appl. No.: 378,936

[22] Filed: Jan. 26, 1995

Related U.S. Application Data

[63] Continuation of Ser. No. 868,683, Apr. 15, 1992, abandoned.

[30] Foreign Application Priority Data

Apr. 23, 1991 [JP] Japan .................................. 3-092287

[51] Int. Cl.$^6$ .................................................. G06K 15/00
[52] U.S. Cl. ......................... 395/110; 395/102; 395/170
[58] Field of Search ................................. 395/102, 110, 395/115, 139, 150, 151; 400/61–63, 70–74; 345/192, 195, 194, 127, 129, 130; 382/298–301

[56] References Cited

U.S. PATENT DOCUMENTS

| | | | |
|---|---|---|---|
| 4,331,955 | 5/1982 | Hansen ..................................... | 395/115 |
| 4,542,412 | 9/1985 | Fuse et al. ............................... | 395/115 |
| 4,907,282 | 3/1990 | Daly et al. ............................... | 395/115 |
| 5,241,653 | 8/1993 | Collins et al. ........................... | 395/139 |

FOREIGN PATENT DOCUMENTS

| | | | |
|---|---|---|---|
| 389131 | 9/1990 | European Pat. Off. ......... | G09G 1/14 |
| 461811 | 12/1991 | European Pat. Off. ........ | G06F 15/72 |
| 159270 | 6/1991 | Taiwan . | |

OTHER PUBLICATIONS

"Reduction of Character Raster Pattern Resolution Without Stroke Width Variation", in IBM Technical Disclosure Bulletin, vol. 28 No. 11 (486).

*Primary Examiner*—Arthur G. Evans
*Attorney, Agent, or Firm*—Fitzpatrick, Cella, Harper & Scinto

[57] ABSTRACT

An output apparatus for outputting a character or the like by using an outline font comprises: an outline information memory to store outline information which expresses a character by points on the outline; a correction information memory to store correction information to correct a value of the outline information; and a correction unit to correct the outline information stored in the outline information memory by using the correction information stored in the correction information memory, thereby preventing a slight difference of the outline points of the original character from a large difference when the character size is changed, and enabling such a slight difference to be correctly expressed when the character is enlarged.

15 Claims, 8 Drawing Sheets

FIG. 3

| X-COORDINATE | Y-COORDINATE | FLAG | CORRECTION X | CORRECTION Y |
|---|---|---|---|---|
| 0 | 0 | 0 | 0 | 0 |
| 50 | 0 | 1 | -2 | 0 |
| 0 | 150 | 1 | 0 | 0 |
| 152 | 0 | 1 | 0 | 0 |
| 0 | -150 | 1 | 0 | 0 |
| 50 | 0 | 1 | 0 | 0 |
| 0 | 350 | 1 | 0 | 0 |
| -50 | 0 | 1 | 0 | 0 |
| 0 | -150 | 1 | 0 | 0 |
| -152 | 0 | 1 | 0 | 0 |
| 0 | 150 | 1 | 0 | 0 |
| -50 | 0 | 1 | 2 | 0 |
| 0 | -350 | 1 | 0 | 0 |
| 0 | 0 | -1 | 0 | 0 |

| X-COORDINATE | Y-COORDINATE |
|---|---|
| 0 | 0 |
| 5 | 0 |
| 5 | 15 |
| 20 | 15 |
| 20 | 0 |
| 25 | 0 |
| 25 | 35 |
| 20 | 35 |
| 20 | 20 |
| 5 | 20 |
| 5 | 35 |
| 0 | 35 |
| 0 | 0 |

| X-COORDINATE | Y-COORDINATE | FLAG |
|---|---|---|
| 0 | 0 | 0 |
| 48 | 0 | 1 |
| 0 | 150 | 1 |
| 152 | 0 | 1 |
| 0 | -150 | 1 |
| 50 | 0 | 1 |
| 0 | 350 | 1 |
| -50 | 0 | 1 |
| 0 | -150 | 1 |
| -152 | 0 | 1 |
| 0 | 150 | 1 |
| -48 | 0 | 1 |
| 0 | -350 | 1 |
| 0 | 0 | -1 |

| X-COORDINATE | Y-COORDINATE |
|---|---|
| 0 | 0 |
| 4 | 0 |
| 4 | 15 |
| 19 | 15 |
| 19 | 0 |
| 24 | 0 |
| 24 | 35 |
| 19 | 35 |
| 19 | 20 |
| 4 | 20 |
| 4 | 35 |
| 0 | 35 |
| 0 | 0 |

| X-COORDINATE | Y-COORDINATE |
|---|---|
| 0 | 0 |
| 3 | 0 |
| 3 | 8 |
| 11 | 8 |
| 11 | 0 |
| 14 | 0 |
| 14 | 18 |
| 11 | 18 |
| 11 | 10 |
| 3 | 10 |
| 3 | 18 |
| 0 | 18 |
| 0 | 0 |

FIG. 11
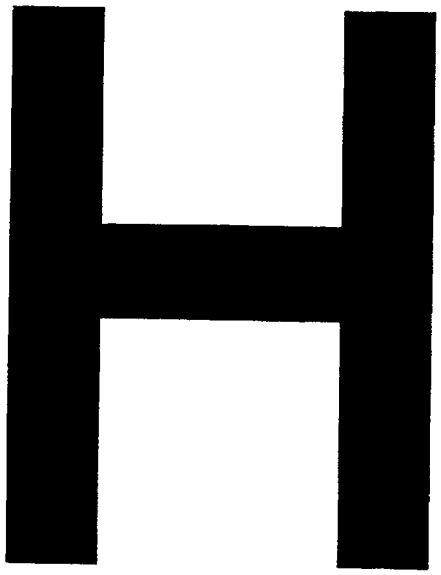
FIG. 12 PRIOR ART
| X-COORDINATE | Y-COORDINATE |
|---|---|
| 0 | 0 |
| 2 | 0 |
| 2 | 8 |
| 10 | 8 |
| 10 | 0 |
| 13 | 0 |
| 13 | 18 |
| 10 | 18 |
| 10 | 10 |
| 2 | 10 |
| 2 | 18 |
| 0 | 18 |
| 0 | 0 |
FIG. 13 PRIOR ART
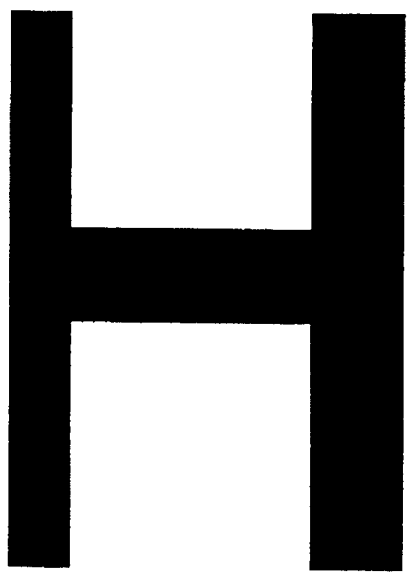

$$0 \leq t \leq 1$$

FOR A BEZIER CURVE COMPRISING $P_1(X_1, Y_1), P_2(X_2, Y_2), P_3(X_3, Y_3)$ AND $P_4(X_4, Y_4)$

OUTPUT METHOD AND APPARATUS

This application is a continuation of application Ser. No. 07/868,683, filed Apr. 15, 1992, now abandoned.

BACKGROUND OF THE INVENTION

1. Field of the Invention

The invention relates to an output method and apparatus for outputting by using an outline font.

2. Related Background Art

Hitherto, a printing apparatus has performed printing by using a bit map font or an outline font. In this instance, the data making up the outline font is constructed by outline information and auxiliary information to prevent an outline of the same width being seen as different outlines as a result of a calculation error.

In the conventional example, however, when the widths of outlines on the outline font data are not equal but are slightly different, even in the case where an original character is developed for output as a small character, the original outlines are judged as outlines of different widths, so that there are the following drawbacks.

(1) When an original character is developed as a small character, the difference of the widths becomes remarkable.

(2) If the widths are set to the same value, when a character is enlarged, delicate lines cannot be expressed, and the quality of the character deteriorates.

SUMMARY OF THE INVENTION

According to the invention, by providing correction information for outline width, the width of the outlines is kept from becoming extremely different without deterioration of the apparatus and method's ability to express the character.

BRIEF DESCRIPTION OF THE DRAWINGS

FIG. 3 is a table showing examples of outline information and auxiliary information in the invention;

FIG. 11 is a diagram showing the outline of the character of FIG. 10;

FIG. 12 is a table showing a character outline developed by a method of rounding to the nearest whole number by using the conventional technique;

FIG. 13 is a diagram showing an example of the character outline of FIG. 12; and FIG. 14 is a diagram showing developing equations of a Bezier curve.

DESCRIPTION OF THE PREFERRED EMBODIMENTS

Embodiments of the present invention will be described in detail hereinbelow with reference to the drawings. The invention can be applied to an apparatus or a system or can be also applied to the case of accomplishing the invention by supplying a program to an apparatus or a system.

Figure 1:
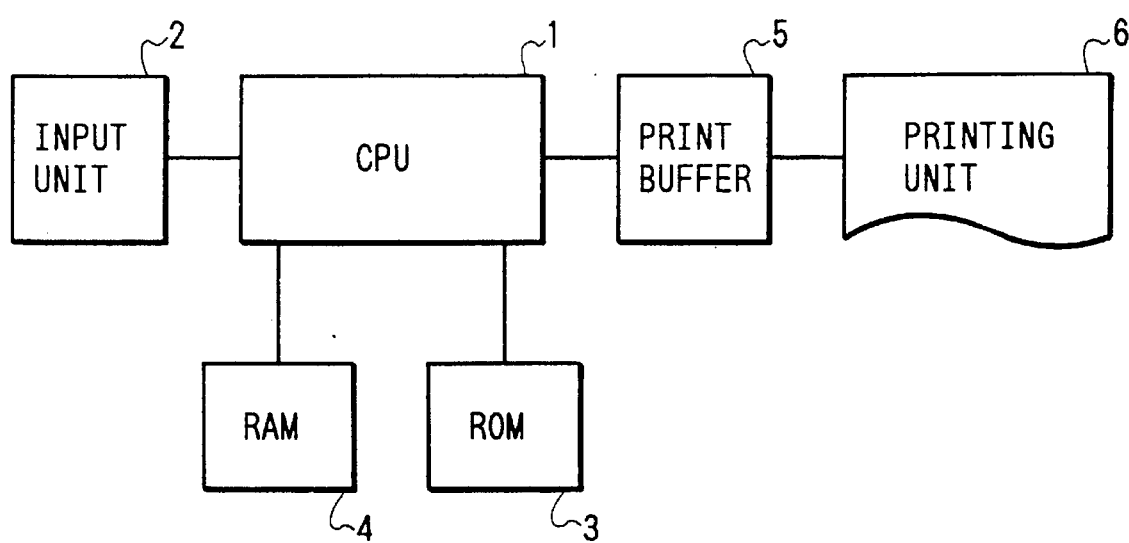
FIG. 1 is a block diagram of a printing apparatus which embodies the present invention.

FIG. 1 is a block diagram for explaining the invention. In the diagram, reference numeral 1 denotes a CPU to control a printing apparatus of the invention in accordance with a program; 2 indicates an input unit which receives data that is transmitted from a host computer; 3 a ROM to store a program to control the printing apparatus such as a program, which will be explained hereinlater, and outline font data; 4 a RAM which is used as a work memory when printing; 5 a print buffer to store print data in the form of a bit map; and 6 a printing unit to print on paper in accordance with a bit image developed by the print buffer.

Figure 2:
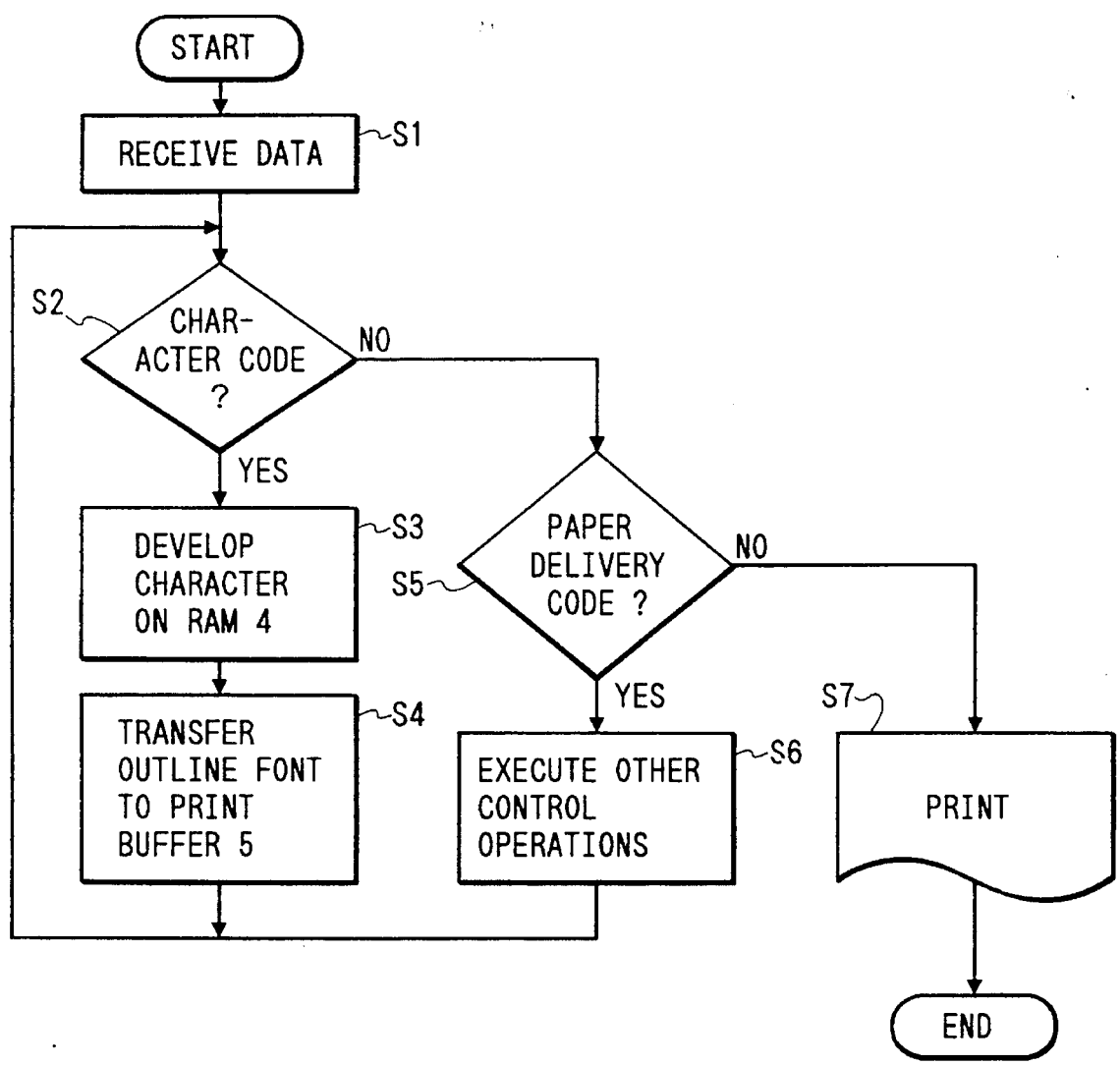
FIG. 2 is a flowchart showing control of the printing apparatus which embodies the invention.

The control of the printing apparatus of FIG. 1 will now be described with reference to the flowchart of FIG. 2. In step 1 in FIG. 2, data is received from the host computer. In step 2, a check is made to see if the received data is a character code or a control code. A character is developed into the RAM 4 from the outline font in accordance with the character code. In step 4, the outline font developed in step 3 is transferred into the print buffer 5. In step 5, a check is made to see if the control code is a paper delivery code or not. If it is a paper delivery code, step 6 follows. If NO, step 7 follows. In step 7, the content in the print buffer 5 is supplied to the printing unit 6 and printed, thereby finishing the printing operation. In step 6, other control operations of the printer are executed in accordance with the control code.

FIG. 3 is a diagram showing outline information of a character "H" and correction information to calculate the outline of the character "H". In the case of the character "H" in the example, the width of the left stem is constructed by 48 dots and the width of the right stem is constructed by 50 dots. A flag value of 0 indicates that the coordinates are absolute coordinates. In the case of 1, the coordinates are relative to the position of X and Y just before. The flag having a value of −1 shows the end of data. A unit of each of the coordinates X and Y and the correction values X and Y is set to dot.

Figure 4:
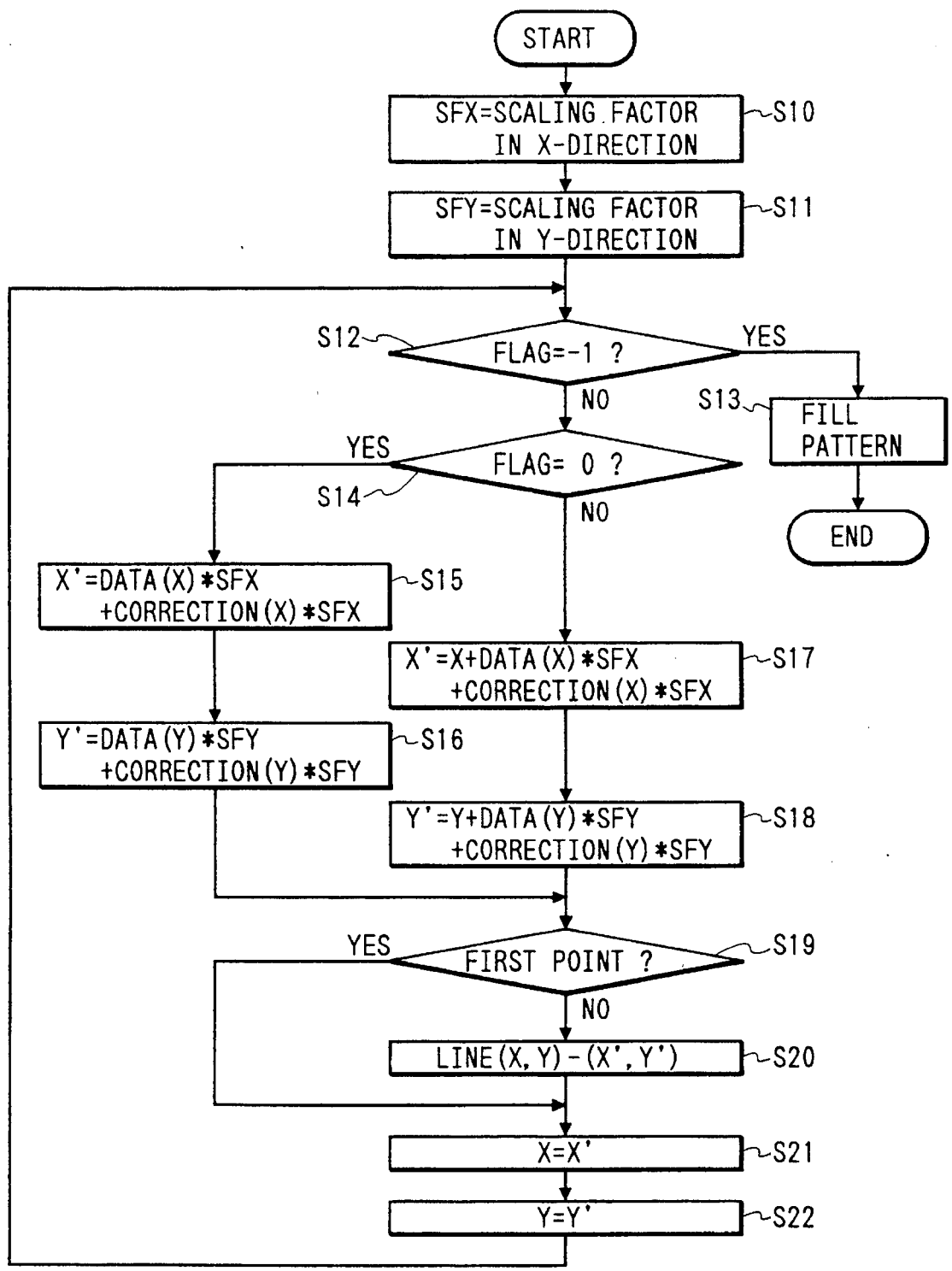
FIG. 4 is a flowchart for developing a character from the outline information and the correction information.

FIG. 4 is a flowchart for a subroutine to develop the data of the format shown in FIG. 3. In the diagram, in step 10, a scaling factor in the X direction is substituted to SFX. In step 11, a scaling factor in the Y direction is substituted to SFY. In step 12, the value of the flag is read, thereby judging whether it is equal to −1 or not. When it is −1, step 13 is executed. If NO, step 14 is executed. In step 13, all of the bits corresponding to the dots in the outline drawn are set to ON, and the subroutine is finished. In step 14, a check is made to see if the flag is set to 0 or not. When it is equal to 0, step 15 follows. If NO, step 17 follows. In step 15, the X coordinate is calculated on the assumption that the coordinate data indicates the absolute coordinate, and the calculated coordinate value is substituted for X'. In step 16, the Y coordinate is calculated on the assumption that the coordinate data indicates the absolute coordinate, and the calculated coordinate value is substituted for Y'. In step 17, the X coordinate is calculated on the assumption that the coordinate data indicates a relative coordinate, the calculation is performed by using the X coordinate just before, and the calculated coordinate value is substituted for X'. In step 18, the Y coordinate is calculated by using the Y coordinate just before on the assumption that the coordinate data indicates a relative coordinate. The calculated coordinate value is substituted to Y'. In steps 15 to 18, DATA(X) denotes data of the X coordinate; DATA(Y) indicates data of the Y coordinate; CORRECTION (X) denotes data of the correction X; and CORRECTION (Y) represents data of the correction Y, respectively. It is assumed that the above calculations are executed on the basis of integer values, and the decimal portion omitted. In step 19, a check is made to see if the calculated point is the first point of the outline or not. When it is the first point, step 21 follows. If NO, step 20 follows. In step 20, the coordinates (X, Y) of the point just before and the coordinates (X', Y') which have been calculated at present are connected by a straight line. In step 21, X' is substituted for X. In step 22, Y' is substituted for Y. The processing routine advances to step 12 to process the next data.

Figures 5, 6, 7:
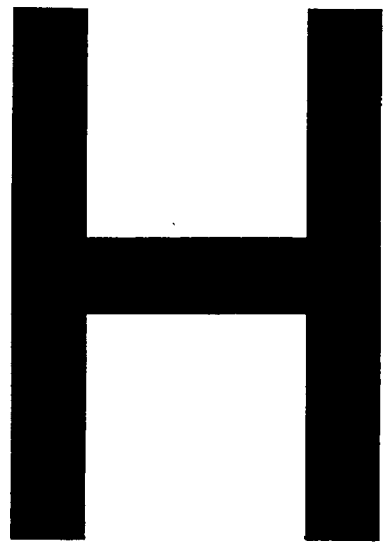
FIG. 5 is a table showing an example of a character outline which has been calculated from the outline information and the correction information.
FIG. 6 is a diagram showing an outline of the character of FIG. 5.
FIG. 7 is a table showing an example of outline information in a conventional technique.

FIG. 5 is a table showing outline information in the case where the data of FIG. 3 is developed by the algorithm of FIG. 4. The scaling factor is set to 1/10.

FIG. 6 relates to an example showing the case of generating on the basis of the invention by FIG. 5.

Effects of the invention with respect to the output examples mentioned above are shown in comparison with the conventional techniques.

FIG. 7 is a diagram showing data of the same character as that of FIG. 3 by using the conventional technique. Obviously, no correction information exists in the conventional technique.

Figures 8, 9, 10:
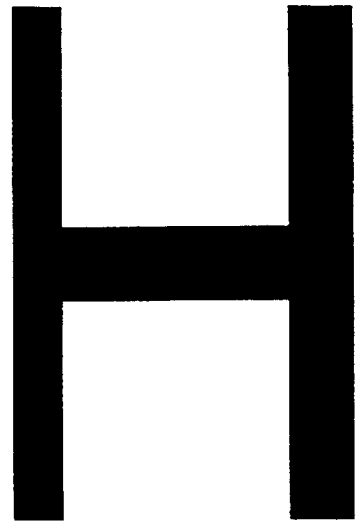
FIG. 8 is a table showing a character outline developed by a conventional technique.
FIG. 9 shows an example of the character outline of FIG. 8.
FIG. 10 is a table showing an example of a character outline calculated from the outline information and the correction information by a method of rounding to the nearest whole number.

FIG. 8 is a table showing outline information in the case of developing the data of FIG. 7 by using the conventional technique. The scaling factor is equal to 1/10.

FIG. 9 relates to an example showing FIG. 8. It will be obviously understood that the quality of the character shown in FIG. 9 is inferior to that shown in FIG. 6. A ratio of the widths of the stems of "H" is equal to 48 dots to 50 dots. When such a ratio is scaled down into 1/10, it becomes 4.8:5.0. When it is further rounded into integers, it becomes 4:5 although the ratio of 5:5 is desirable. Although the left stem is inherently smaller than the right stem by only 4%, in the case of the character shown in FIG. 9 which has been developed by the conventional technique, the left stem is smaller than the right stem by about 20%. On the other hand, according to the invention, a desirable width ratio of 5:5 is derived.

Embodiment 2

There will be explained an embodiment in the case where the process to omit the fractions is not used but a process to round to the nearest whole number is used in the calculations when executing steps 15 to 18 in FIG. 4 in the construction of the embodiment mentioned above.

FIG. 10 is a table showing outline information when the data of FIG. 3 is developed by the algorithm of FIG. 4. The scaling factor is equal to 1/20. In the calculations in steps 15 to 18, the fractions are not omitted but are rounded to the nearest whole number.

FIG. 11 shows an example of a character generated according to the invention on the basis of FIG. 10.

The effects of the present invention mentioned above will now be explained in comparison with the conventional technique.

FIG. 12 is a table showing outline information when the data of FIG. 7 is developed by using the conventional technique. The scaling factor is equal to 1/20. In the calculation of the outline, the fractions are not omitted but are rounded to the nearest whole number.

FIG. 13 shows an example of a character generated according to the conventional method on the basis of FIG. 12.

As will be obviously understood from FIGS. 11 and 13, the widths of the left and right stems according to the conventional developing system are set to two and three dots, respectively. According to the developing system of the invention, however, the widths of both of the left and right stems are equal to three dots. When the conventional technique is used for a character such that a difference of the widths of the stems of the original character is merely equal to 4%, a difference of 33% can occur. According to the invention, however, a character of a higher quality can be generated.

Embodiment 3

Although the above embodiments have been described with respect to the case where a character is expressed by only straight lines, a similar effect is also obtained for a character which is expressed by a curve. FIG. 14 shows general equations of a Bezier curve. The Bezier curve comprises four points. Two points, at both ends, are edge points, while the two intermediate points are control points. A well balanced curve is developed by controlling the edge points and the intermediate points. Postscript ® is one language for printer control using a Bezier curve. Since many examples in which the Bezier curve is applied to characters already exist, their detailed descriptions are omitted here. In this case as well, the invention can be obviously applied.

As shown above, by adding the correction information to the outline information of a character, a symmetrical character having a high quality can be generated irrespective of a calculating method such as method of omitting the fractions, method of raising the fractions to the unit, or method of rounding to the nearest whole number.

It is also possible to use a method whereby the scaling factor is judged and the process similar to that in the conventional technique is executed up to a predetermined reduction ratio (for example, 1/8). The scaling factor can be also set by using a CRT keyboard or the like.

According to the invention as explained in detail above, by providing the correction information of the outline, it is possible to prevent the inconvenience such that character lines of different widths become extremely different due to the output size. The invention can be obviously also applied to a display apparatus such as a CRT or the like or a printing apparatus such as ink jet printer, laser beam printer, or the like.

Lastly, in the case of reducing a character having a portion whose width is equal to 48 dots and a portion whose width is equal to 50 dots (reduction ratio is set to 1/10 and the fractions are omitted), 50 dots are reduced into 5 dots and 48 dots are expressed as (50−2) and (50/10−2/10) is calculated, so that 5−0=5. That is, in the case of a large output size, although there is a width difference, in the case of outputting by a small size, the character is generated in a state such as not to cause a difference. In this manner, an output character of a high quality is realized.

What is claimed is:

1. A character processing apparatus comprising:

first memory means for storing coordinate point information for expressing a character pattern;

second memory means for storing correction information for expressing a character pattern including at least two lines which slightly differ in width from each other; and generating means for using the coordinate point information stored in said first memory means and the correction information stored in said second memory means to generate a character pattern including at least two lines which slightly differ in width from each other, if the character pattern to be generated is larger than a predetermined size, and for that information to generate a character pattern those at least two lines are equal in width to each other, if the character pattern to be generated is smaller than a predetermined size.

2. An apparatus according to claim 1, further comprising means for outputting the character pattern generated by said generating means.

3. An apparatus according to claim 2, wherein said output means comprises a printer or a display device.

4. An apparatus according to claim 1, wherein the correction information stored in said second memory means has no effect on generation of a character pattern by said generating means if the character pattern is smaller than a predetermined size.

5. An apparatus according to claim 1, wherein said generating means adds the coordinate point information, as size-changed and as rounded into integer values, to the correction information, as size-changed and as rounded into integer values, so as to derive coordinate point information for a character pattern to be output, and generates the character pattern on the basis of the derived coordinate point information.

6. A character processing method using a first memory which stores coordinate point information for expressing a character pattern and a second memory which stores correction information for expressing a character patter including at least two lines which slightly differ in width from each other, said method comprising the steps of:

generating a character pattern including at least two lines which slightly differ in width from each other, if the character pattern to be generated is larger than a predetermined size, on the basis of the stored coordinate point information and the stored correction information; and generating the character pattern in which those at least two lines are equal in width to each other, if the character pattern to be generated is smaller than a predetermined size, on the basis of the stored coordinate point information and the stored correction information.

7. A method according to claim 6, further comprising the step of outputting the generated character pattern.

8. A method according to claim 7, wherein said output step outputs the generated character pattern using a printer or a display device.

9. A method according to claim 6, wherein the correction information stored in the second memory has no effect on generation of a character pattern in said generating step if the character pattern is smaller than a predetermined size.

10. A method according to claim 6, wherein said generating step includes adding the coordinate point information, as size-changed and as rounded into integer values, to the correction information, as size-changed and as rounded into integer values, so as to derive coordinate point information for a character pattern on the basis of the derived coordinate point information.

11. A memory medium storing program instructions to cause a programmed apparatus to execute a character processing method using a first memory which stores coordinate point information for expressing a character pattern and a second memory which stores correction information for expressing a character patter including at least two lines which slightly differ in width from each other, said method comprising the steps of:

generating a character pattern including at least two lines which slightly differ in width from each other, if the character pattern to be generated is larger than a predetermined size, on the basis of the stored coordinate point information and the stored correction information; and generating the character pattern in which those at least two lines are equal in width to each other, if the character pattern to be generated is smaller than a predetermined size, on the basis of the stored coordinate point information and the stored correction information.

12. A memory medium according to claim 11, further comprising the step of outputting the generated character pattern.

13. A memory medium according to claim 12, wherein said output step outputs the generated character pattern using a printer or a display device.

14. A memory medium according to claim 11, wherein the correction information stored in the second memory has no effect on generation of a character pattern in said generating step if the character pattern is smaller than a predetermined size.

15. A memory medium according to claim 11, wherein said generating step includes adding the coordinate point information, as size-changed and as rounded into integer values, to the correction information, as size-changed and as rounded into integer values, so as to derive coordinate point information for a character pattern on the basis of the derived coordinate point information.

* * * * *

UNITED STATES PATENT AND TRADEMARK OFFICE
CERTIFICATE OF CORRECTION

PATENT NO. : 5,623,584

DATED : April 22, 1997

INVENTOR(S) : TSUNEAKI KURUMIDA

It is certified that error appears in the above-identified patent and that said Letters Patent is hereby corrected as shown below:

[57] ABSTRACT

Line 10, "from" should read --from becoming--.

COLUMN 5

Line 39, "patter" should read --pattern--.

COLUMN 6

Line 21, "patter" should read --pattern--.

COLUMN 4

Line 33, "Postscript®" should read --Post Script®--.

Signed and Sealed this

Fourteenth Day of October, 1997

Attest:

BRUCE LEHMAN

Attesting Officer

Commissioner of Patents and Trademarks